United States Patent
Akama

(10) Patent No.: US 8,671,148 B2
(45) Date of Patent: Mar. 11, 2014

(54) ELECTRONIC MAIL TERMINAL APPARATUS, MAIL SERVER, CHECK CODE REGISTERING METHOD, AND MAIL RECEPTION PERMITTING METHOD

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 12/538,989

(22) Filed: Aug. 11, 2009

(65) Prior Publication Data

US 2009/0300728 A1    Dec. 3, 2009

Related U.S. Application Data

(63) Continuation of application No. PCT/JP2007/000227, filed on Mar. 15, 2007.

(51) Int. Cl.
    G06F 15/16    (2006.01)
(52) U.S. Cl.
    USPC .......................... 709/206; 709/238
(58) Field of Classification Search
    USPC ................................ 709/206, 238
    See application file for complete search history.

(56) References Cited

U.S. PATENT DOCUMENTS

| 2003/0069935 | A1 | 4/2003 | Hasegawa | |
|---|---|---|---|---|
| 2003/0167402 | A1* | 9/2003 | Stolfo et al. | 713/200 |
| 2007/0266098 | A1* | 11/2007 | Gordon | 709/206 |

FOREIGN PATENT DOCUMENTS

| JP | 2001-217861 | 8/2001 |
|---|---|---|
| JP | 2003-114851 | 4/2003 |
| JP | 2003-134570 | 5/2003 |
| JP | 2003-224605 | 8/2003 |
| JP | 2003-249963 | 9/2003 |
| JP | 2004-102352 | 4/2004 |
| JP | 2004-260792 | 9/2004 |
| JP | 2005-044323 | 2/2005 |
| JP | 2005-303389 | 10/2005 |
| WO | 2004/057480 | 7/2004 |
| WO | 2007/021260 | 2/2007 |

OTHER PUBLICATIONS

International Search Report for PCT/JP2007/000227, mailed Jun. 5, 2007.
Japanese Office Action mailed Jun. 8, 2010 in corresponding Japanese Patent Application No. 2009-503776.
Partial English Translation of JP 2001-217861.
Japanese Office Action issued Aug. 31, 2010 in corresponding Japanese Patent Application 2009-503776.

* cited by examiner

*Primary Examiner* — Adnan Mirza
(74) *Attorney, Agent, or Firm* — Staas & Halsey LLP

(57) ABSTRACT

An apparatus includes: an address book to store mail addresses; an address registration unit to register a mail address of electronic mail in the address book; a check code generation unit to generate a check code from the mail address; and a check code transmission unit to transmit a mail reception permission notification including the check code generated from the mail address to a registration unit.

14 Claims, 8 Drawing Sheets

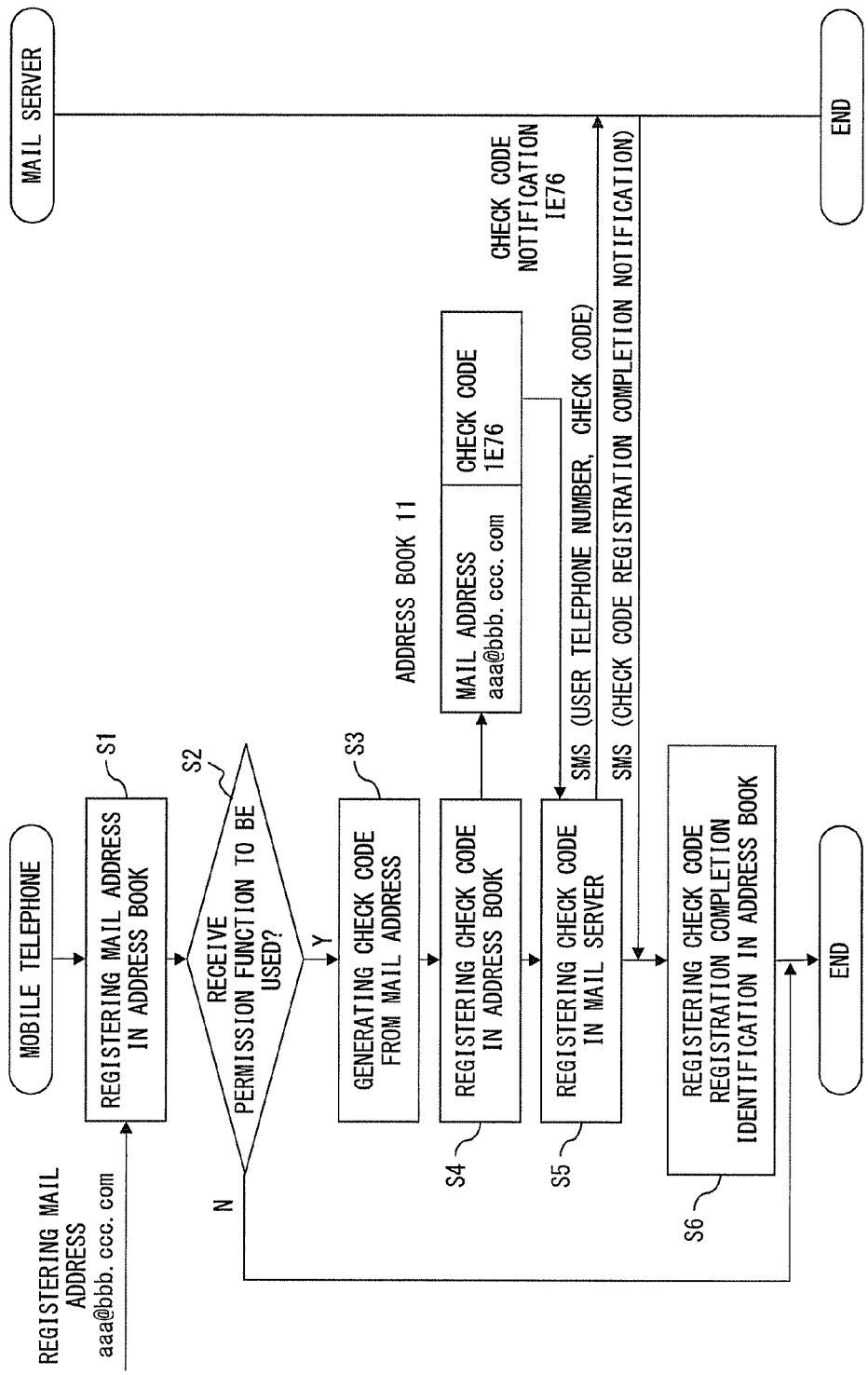
F I G. 2

| 090-2222-7777 | 0x1E76<br>0xBB12<br>0x9834<br>⋮ |
|---|---|
| 090-2317-6666 | 0x3AE6<br>0xCB98<br>0x522D<br>⋮ |

F I G. 4

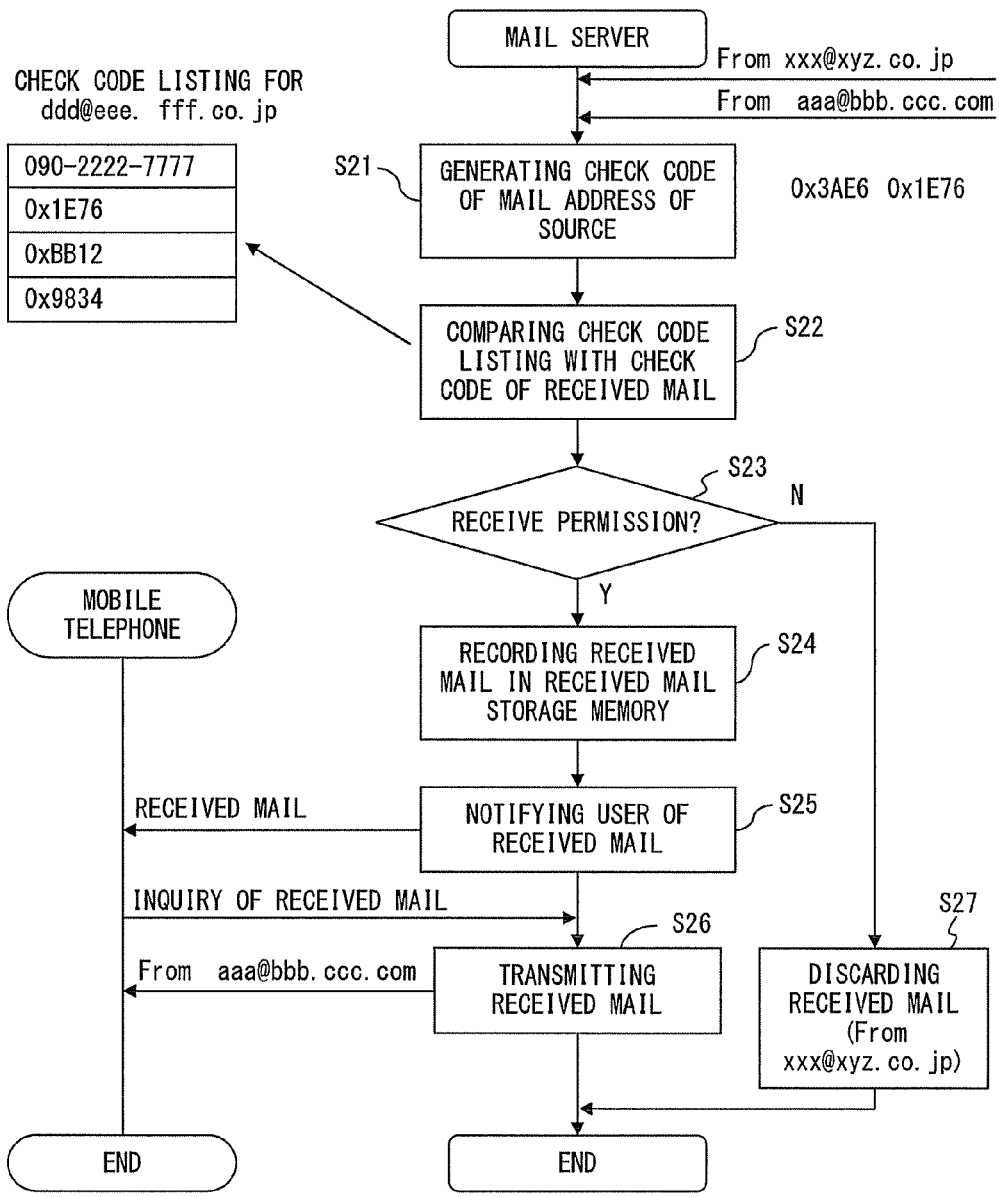
F I G. 5

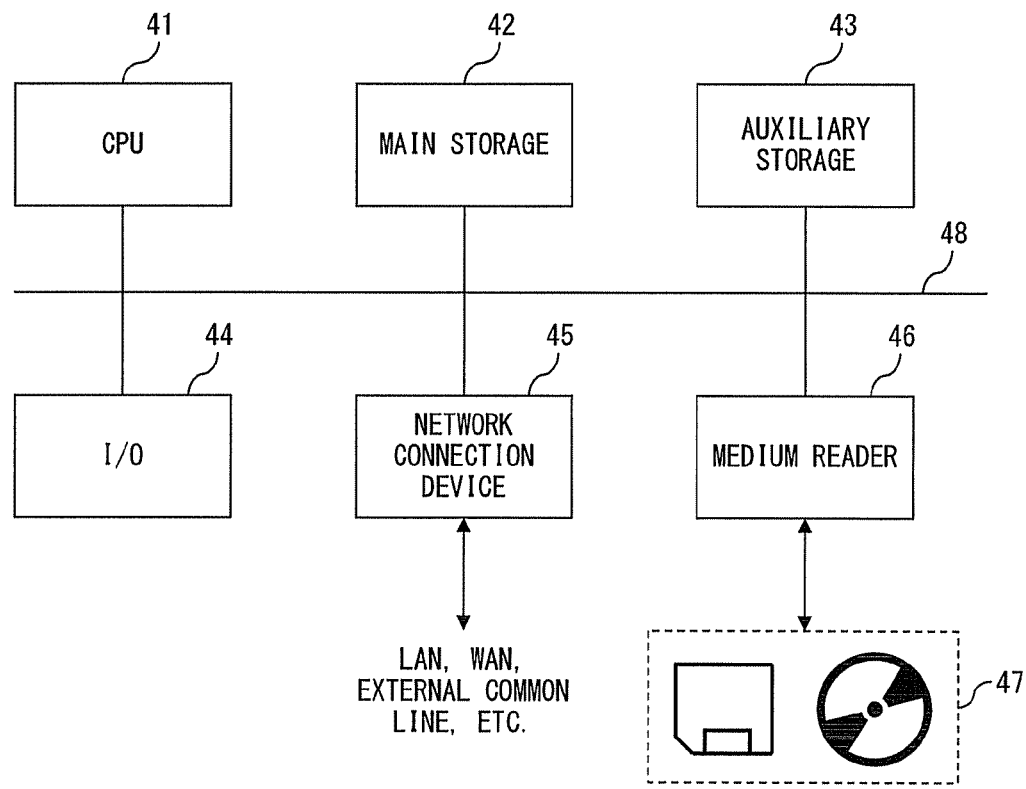
F I G. 7

ELECTRONIC MAIL TERMINAL APPARATUS, MAIL SERVER, CHECK CODE REGISTERING METHOD, AND MAIL RECEPTION PERMITTING METHOD

CROSS-REFERENCE TO RELATED APPLICATIONS

This application is a continuation application of International PCT Application No. PCT/JP2007/000227 which was filed on Mar. 15, 2007.

FIELD

The embodiments discussed herein are related to an electronic mail terminal apparatus and an electronic mail system having a mail function.

BACKGROUND

Recently, with an increasing number of Internet users, electronic mail has been widespread not only by personal computers (PCs) but also by mobile telephones. Correspondingly, there are increasing numbers of pieces of electronic mail for advertisement, solicitation, etc. that is, unsolicited commercial mail.

There are ever-growing numbers of pieces of unsolicited commercial mail, and communication common carriers and mail receivers have proposed and performed various countermeasures against the unsolicited commercial mail.

Patent Document 1 discloses a method against general unsolicited commercial mail.

The patent document 1 is to prevent mail including specific mail addresses and character strings from being distributed to users by registering the specific addresses and character strings in a mail server and filtering out the mail including the specific addresses and character strings.

In the conventional mail services of the patent document 1 etc., mail from a desired mail address can be received by registering an address with a receive permit according to the operation on the Web screen after a connection to a mail server.

Patent Document 1: Japanese Laid-open Patent Publication No. 2005-44323

SUMMARY

According to an aspect of the embodiment, an electronic mail terminal apparatus includes an address book, an address registration unit, a check code generation unit, and a check code transmission unit.

The address book stores mail addresses.

The address registration unit registers a mail address of electronic mail in the address book.

The check code generation unit generates a check code from the mail address.

The check code transmission unit transmits a mail reception permission notification including the check code generated from the mail address to a registration unit.

According to another aspect of the embodiment, a mail server includes a check code storage unit, a check code registration unit, a check code comparison unit, and a mail transmission unit.

The check code storage unit stores a check code associated with an electronic mail terminal apparatus that has transmitted the check code.

The check code registration unit registers in the check code storage unit the check code transmitted from the electronic mail terminal apparatus.

The check code generation unit generates the check code from a mail address of a source of received mail.

The check code comparison unit compares the check code generated by the check code generation unit with the check code associated with the electronic mail terminal apparatus as a destination of the received mail.

The mail transmission unit transmits the received mail to the electronic mail terminal apparatus when the check codes match each other as a result of comparison by the check code comparison unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flowchart of the operation and process of a mobile telephone according to an embodiment when a mail address is registered in the address book;

FIG. 4 illustrates an example of a check code stored in the check code storage unit of a mail server;

FIG. 5 is a flowchart of the process performed when mail is received by the mail server according to an embodiment;

FIG. 7 illustrates the system environment of an information processing device of a PC etc. connected to a mobile telephone, an information processing device when an electronic mail terminal apparatus is the information processing device, and an information processing device configuring a mail server.

DESCRIPTION OF EMBODIMENTS

As described previously, mail from a desired mail address can be received by registering an address with a receive permit in a mail server. However, to use such a method, a mail address to be filtered out or an address with a receive permit is to be registered in a mail server.

The process of registering a mail address with (or without) a receive permit is performed by a user making a connection to a mail server and registering each address in the mail server. Therefore, the registering procedure is complicated and has become a heavy load on elders, etc.

In addition, there occurs the problem of privacy protection when the mail address of each user is registered in a mail server.

Preferred embodiments of the present invention will be explained with reference to accompanying drawings.

In the mail system according to an embodiment, when a user registers a new mail address in an address book, a check code referring to the mail address is automatically generated from the mail address, and the code is registered with the mail address in the address book.

At this time, the check code registered in the address book is transmitted to a mail server when it is registered in the address book, and is registered in the mail server.

Hereinafter, the mail server converts the mail address of the source of the mail into a check code when the mail is distributed to a user, and distributes the mail only when the code matches the check code registered in the mail server.

Thus, the user is distributed electronic mail whose check code has been registered, thereby preventing unsolicited commercial mail from being distributed to the user.

In addition, since not a mail address but a check code converted from the mail address is registered in the mail server, the problem of privacy can also be solved.

Described below is an example of the electronic mail terminal apparatus according to the present embodiment as a mobile telephone. The electronic mail terminal apparatus according to the present embodiment is not limited to a mobile telephone, but may be realized by other information processing terminal having an electronic mail function such as a PC etc.

The present embodiment also includes a check code registering method, a mail reception permitting method, a program, and a storage medium.

Figure 1:
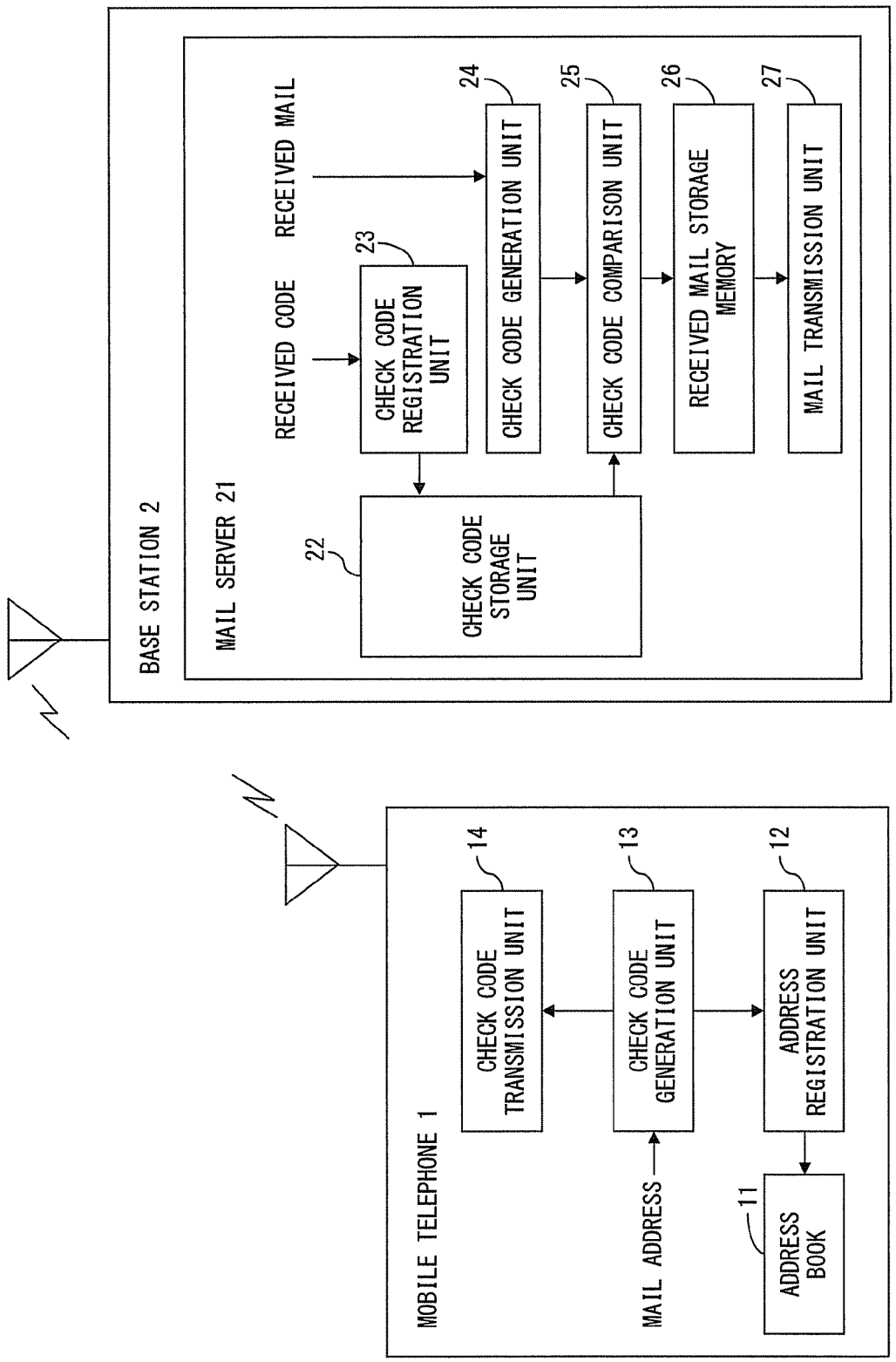
FIG. 1 illustrates an example of the configuration of the system according to an embodiment.

FIG. 1 illustrates an example of the configuration of the system according to an embodiment, and illustrates only the components related to the present embodiment.

The electronic mail function of a mobile telephone is used in the example in FIG. 1.

A mobile telephone 1 according to the present embodiment includes an address book (telephone book) 11, an address registration unit 12, a check code generation unit 13, and a check code transmission unit 14.

The address registration unit 12 registers in the address book 11 the mail address input from the input unit not illustrated in FIG. 1. The check code corresponding to the mail address generated by the check code generation unit 13 is also registered in the address book 11. The check code generation unit 13 converts the mail address input to the mobile telephone 1 into a check code. When the mail address is registered in the address book 11, the check code transmission unit 14 transmits mail address or telephone number of the mobile telephone 1 with the check code to a base station 2 using, for example, SMS communications.

With the above-mentioned configuration, when the mail address is registered in the address book 11 in the mobile telephone 1, the check code corresponding to the registered mail address is transmitted to the base station 2, and registered in a mail server 21 of the base station 2. Therefore, the user performs only the operation of registering the mail address in the address book 11, and it is not necessary for the user to perform the complicated operation when the registration is performed in the mail server 21.

The mail server 21 of the base station 2 includes a check code storage unit 22, a check code registration unit 23, a check code generation unit 24, a check code comparison unit 25, a received mail storage memory 26, and a mail transmission unit 27.

The check code storage unit 22 stores the check code transmitted from each mobile telephone 1 with the check code associated with the mail address or telephone number of the mobile telephone 1. The check code registration unit 23 registers the check code transmitted from each mobile telephone in the check code storage unit 22. The check code generation unit 24 generates a check code from the mail address with the same algorithm as the check code generation unit 13 of the mobile telephone 1. The check code comparison unit 25 compares the check code generated from the mail address of the received mail by the check code generation unit 24 with the check code stored in the check code storage unit 22, and verifies whether or not they match each other. If they match each other as a result of the comparison by the check code comparison unit 25, it is determined that the received mail is not unsolicited commercial mail and stored in the received mail storage memory 26 for temporarily storing received mail to be transmitted to the mobile telephone. The mail transmission unit 27 transmits the corresponding received mail stored in the received mail storage memory 26 if an inquiry about the received mail is received from the mobile telephone 1.

With the above-mentioned configuration, the check code transmitted from each mobile telephone 1 is registered in the mail server 21 of the base station 2 as the data for a receive permission check. Then, the mail server 21 compares the check code transmitted from the mail address of the source of the received mail with one or more check codes registered in the check code storage unit 22. If they match each other, it is determined the mail is not unsolicited commercial mail, and the mail is transmitted to the mobile telephone 1. If the check codes do not match each other, the electronic mail is discarded as unsolicited commercial mail.

Thus, the present embodiment can prevent unsolicited commercial mail from being transmitted to a user. In addition, since not the mail address itself, but the check code generated by processing the mail address is registered in the mail server 21, the privacy of a user can be protected.

Described below is a practical operation of the mobile telephone 1.

FIG. 2 is a flowchart of the operation and process of the mobile telephone 1 in the present embodiment performed when a mail address is registered in an address book.

When a mail address is input to the mobile telephone 1 according to the present embodiment, the address registration unit 12 registers the mail address in the address book 11 in step S1.

Then, in step S2, it is determined from the set contents or the user operation input contents whether or not the receive permission function is to be used, that is, whether or not the mail address registered in the address book 11 in step S is to be defined as an address with a receive permit. If the function is not used (NO in step S2), the process is terminated.

If the receive permission function is used in step S2 (YES in step S2), a check code is generated by the check code generation unit 13 from the mail address registered in the address book in step S3.

An example of a method for generating a check code can be a method of sequentially adding up the codes of characters forming a character string configuring a mail address.

In this method, when the check code of the mail address aaa@bbb.ccc.com (15 bytes) is generated, the mail address is converted into an ASCII code (16 bits), and every 2 bytes are sequentially added up. Then, the following equation is set.

$$0x6161+0x6140+0x6262+0x622E+0x6363+0x632e+0x636F+0x6d00=0x31E31$$

To make the code as a 2-byte code, the higher 16 bits of 0x0003 are added to the lower 16 bits of 0x1E31 to obtain 0x1E34 as a check code.

The method above is an example, and the method for generating a check code may be any other methods such as shifting the codes of a mail address etc. In the example above, the check code is a 2-byte code, but it is obvious that a larger size may improve checking precision.

When a check code is generated by the check code generation unit 13 in step S3, the address registration unit 12 registers the check code in the address book 11 in step S4. The registration is temporarily performed for the registration of the check code in the mail server 21 in step S5.

Next, in step S5, a mail reception permission notification including the check code together with, for example, the telephone number automatically reported by the SMS is transmitted to the mail server 21. Then, upon receipt of the registration completion notification of the check code by the SMS etc. from the mail server 21, a code (registration completion identification) indicating the completion of the registration of the check code is registered in the address book 11 in step S6, thereby terminating the process. By the process in step S6, the check code not yet registered in the mail server 21 can be registered later after the setting in step S2 is changed later from no use to use of the receive permission function.

Thus, when the mobile telephone 1 according to the present embodiment registers a mail address in its own address book 11, the check code generated from the mail address can be concurrently and automatically registered in the mail server 21. Therefore, a user, even an elder etc., can easily perform a registering process without complicated operations when the registration is performed on the mail server 21.

In the flowchart in FIG. 2, although the check code is transmitted to the mail server 21 after the mail address is registered in the address book 11, the check code may be registered in the address book 11 after it is transmitted to the mail server 21 so far as the registration in the address book is performed concurrently with the transmission to the mail server.

Described below is a practical operation of the mail server 21.

Figure 3:
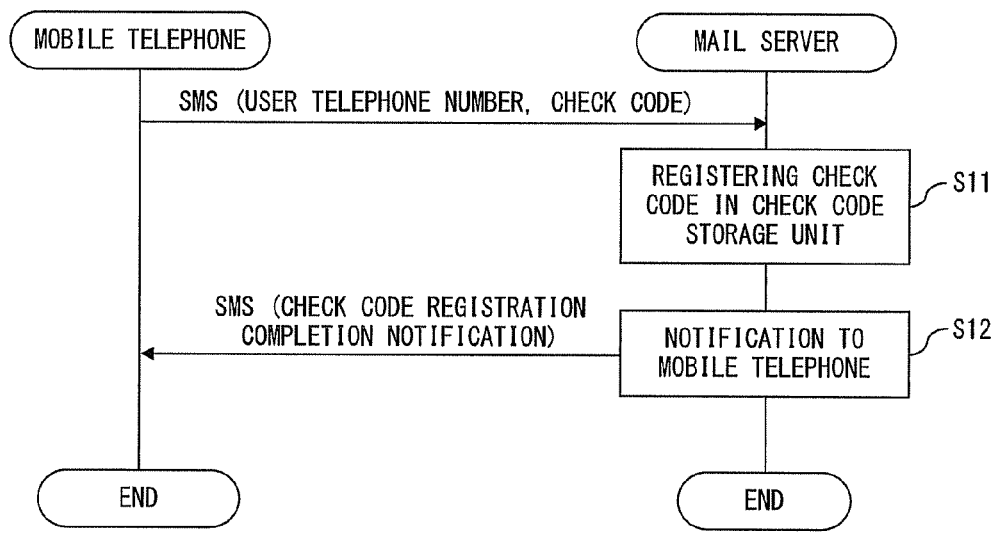
FIG. 3 is a flowchart of the operation and process of a mail server that has received a check code from a mobile telephone according to an embodiment.

FIG. 3 is a flowchart of the operation and process of the mail server 21 that receives a check code from the mobile telephone 1 according to an embodiment.

When the mobile telephone 1 notifies the check code registration unit 23 of a telephone number and a check code by the social networking service (SNS) etc., the check code registration unit 23 of the mail server 21 registers the check code in the check code storage unit 22 with the check code associated with the telephone number in step S11. Then, the mail server 21 notifies the mobile telephone 1 of the registration of the check code by the SNS etc. in step S22, thereby terminating the process.

FIG. 4 illustrates an example of a check code stored in the check code storage unit 22 of a mail server 21.

In FIG. 4, the check code is registered after associated with the telephone number of the telephone that has transmitted the check code.

When a mail receiving process described later is performed, the mail server 21 converts the mail address of the source of the received mail into a check code. Then, by comparing the check code with the check code associated with the telephone number corresponding to the destination, it is determined whether or not the received mail is to be transmitted to the mobile telephone 1 as the destination.

Since a check code which is meaningless itself is stored as associated with a telephone number in the check code storage unit 22, the privacy of a user can be more strongly protected than in the registration of a mail address in a mail server in the conventional technology.

Although the check code is stored as associated with the telephone number of the mobile telephone 1 in the example in FIG. 4, the present embodiment is not limited to the configuration, but the mail address of a mobile telephone may be associated with a check code and then stored.

Described below in detail is the process performed by the mail server 21 when mail is received.

FIG. 5 is a flowchart of the process performed when mail is received by the mail server 21 according to an embodiment.

Upon receipt of electronic mail, the mail server 21 generates a check code from the mail address of the source of the received mail in step S21. In FIG. 5, a check code of 0x3AE6 is generated from the mail address xxx@xyz.co.jp of a source, and a check code of 0x1E76 is generated from the mail address aaa@bbb.ccc.com of another source.

Next, the mail server 21 converts the received mail destination address into the telephone number of the mobile telephone 1, and uses the check code comparison unit 25 to compare the check code registered in the check code storage unit 22 as associated with the telephone number with the check code generated in step S21.

Unless the two check code match each other as a result of the comparison in step S22, it is determined that the mail is unsolicited commercial mail without receive permission (NO in step S23), the received mail is discarded in step S27, and the process terminates.

If the two check code match each other as a result of the comparison in step S22, then it is determined that the mail is not unsolicited commercial mail and is to be received (YES in step S23), and control is passed to step S24.

In FIG. 5, the received mail having the source mail address of xxx@xyz.co.jp and the check code of 0x3AE6 fails to acquire receive permission, and the received mail having the check code of 0x1E76 and the source mail address of aaa@bbb.ccc.com acquires receive permission.

Instep S24, the received mail with receive permission is stored in the received mail storage memory 26.

In step S25, the mail transmission unit 27 notifies the mobile telephone 1 as the destination of the received mail that there is received mail. If an inquiry about the received mail is transmitted from the mobile telephone 1, then the corresponding mail in the received mail storage memory 26 is transmitted to the mobile telephone 1 in step S26, thereby terminating the process. In the example illustrated in FIG. 5, the received mail having the source address of aaa@bbb.ccc.com is transmitted to the mobile telephone 1.

Thus, in the mail server 21 according to the present embodiment, unsolicited commercial mail can be filtered out using a check code transmitted by a mobile telephone. In addition, what is registered in the mail server 21 is not the mail address of the source itself, but is a check code obtained by processing the address. Therefore, the privacy of a user can be successfully protected.

Figure 6:
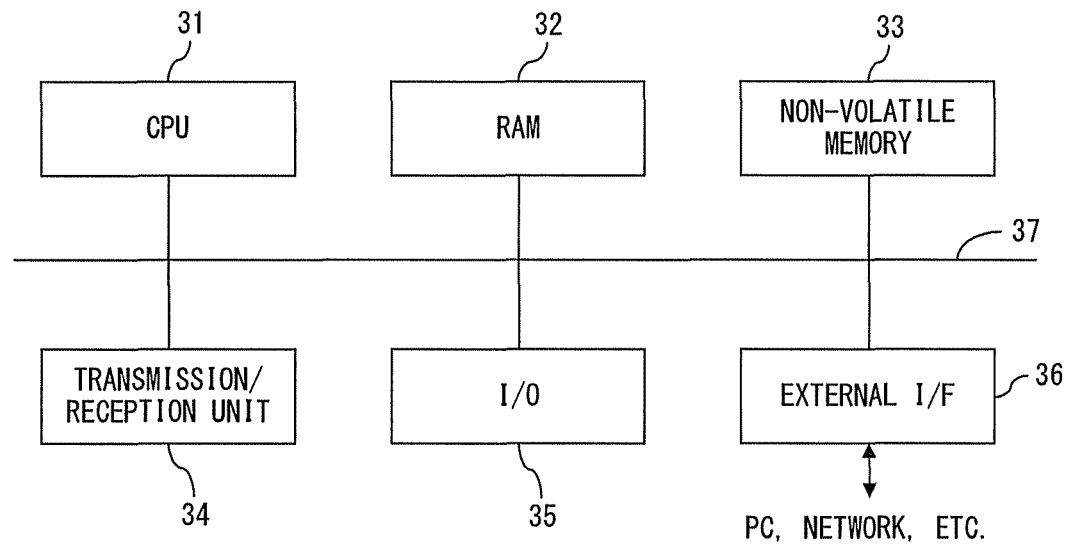
FIG. 6 illustrates an example of the configuration of the hardware of the mobile telephone according to an embodiment.

FIG. 6 illustrates an example of the configuration of the hardware of the mobile telephone 1 according to an embodiment.

In FIG. 6, the mobile telephone 1 includes a central processing unit (CPU) 31, a random access memory (RAM) 32, a non-volatile memory 33, a transmission/reception unit 34, an input/output unit (I/O) 35, and an external interface (I/F) 36. These components are connected via a bus 37.

The CPU 31 executes a program in the non-volatile memory 33, and realizes various functions as a mobile telephone. The RAM 32 is a memory used as a work memory etc. for the CPU 31. The non-volatile memory 33 is a flash memory etc., and stores a firmware program, the address book 11, etc. of the mobile telephone 1. The transmission/reception unit 34 transmits and receives a packet etc. to and from the base station 2. The input/output unit (I/O) 35 includes a display unit for displaying various information and an input button etc. used in inputting a telephone number etc. from a user to the mobile telephone 1. The external interface (I/F) 36 is an interface such as a universal serial bus (USB), Bluetooth, etc. for connection of the mobile telephone 1 to external equipment such as a PC etc.

Each component of the mobile telephone 1 illustrated in FIG. 1 can be realized by dedicated hardware, or can be realized by software, that is, by the CPU 31 executing the firmware program in the non-volatile memory 33.

The firmware program in the non-volatile memory 33 can be rewritten using the data input by external equipment such as a PC etc. or network connected to the external interface (I/F) 36.

FIG. 7 illustrates the system environment of an information processing device of a PC etc. connected to the mobile telephone 1, an information processing device when the electronic mail terminal apparatus is the information processing device, and an information processing device configuring the mail server 21.

The information processing device illustrated in FIG. 7 includes a CPU 41, a main storage 42 such as a RAM etc., an auxiliary storage 43 such as a hard disk etc., a display, an input/output device (I/O) 44 such as a keyboard, a pointing device, etc., a network connection device 45 such as a modem etc., and a medium reader 46 for reading stored contents from a portable storage medium such as a disk, a magnetic tape, etc. These components are interconnected via a bus 48. Each component communicates data with each other through the bus 48.

The CPU 41 realizes the process of the above-mentioned flowchart by executing the program in the auxiliary storage 43 or the program installed through the network connection device 45 using the main storage 42 as a work memory.

In an information processing device illustrated in FIG. 7, the medium reader 46 reads a program and data stored on a storage medium 47 such as a magnetic tape, a flexible disk, a compact disk-read only memory (CD-ROM), a magneto optical disk (MO), etc., and loads them into the main storage 42 or the auxiliary storage 43. By the CPU 41 executing and using the program and data, the above-mentioned process according to the flowchart is realized by software. If the information processing device illustrated in FIG. 7 is the device such as a PC etc. connected to the mobile telephone 1, the process according to the flowchart illustrated in FIG. 2 is realized by software by the CPU 31 illustrated in FIG. 6 executing the firmware program installed on the mobile telephone through the information processing device.

In the information processing device illustrated in FIG. 7, application software can be exchanged using a non-transitory computer-readable storage medium 47 such as a flexible disk etc. Therefore, the present embodiment is not limited to the electronic mail terminal apparatus, the mail server, the check code registering method, the mail reception permitting method, or the program but also be realized as the computer-readable storage medium 47 used to direct a computer to perform the function according to the above-mentioned embodiments when the computer uses the storage medium 47.

Figure 8:
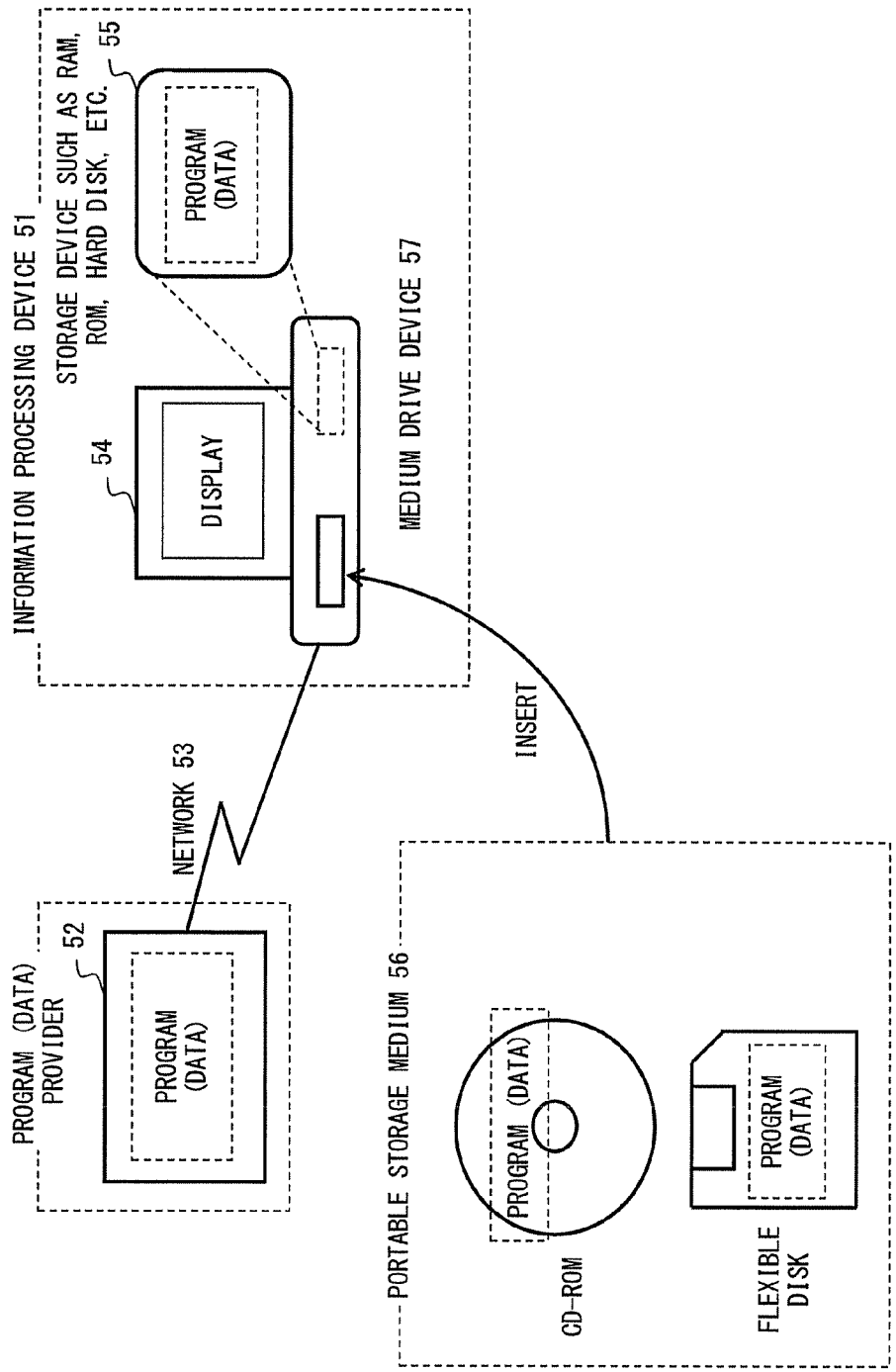
FIG. 8 illustrates an example of a storage medium.

In this case, a "storage medium" includes, for example as illustrated in FIG. 8, a portable storage medium 56 freely removable from a medium drive device 57 such as CD-ROM, a flexible disk (or an MO, a digital versatile disk (DVD), a removable hard disk, etc.), a storage unit (database etc.) 52 in an external device (server etc.) for transmission through a network line 53, a memory (RAM or hard disk etc.) 55 etc. in a main body 54 of an information processing device 51. A program stored in the portable storage medium 56 and the storage unit (database etc.) 52 is executed by loading into the memory (RAM or hard disk etc.) 55 in the main body 54.

In addition to the above-mentioned CD-ROM, a DVD-ROM etc., various large capacity storage media to be hereafter developed may be used as the storage medium. Such a large capacity storage medium includes a next generation optical disk storage medium using blue laser such as Blu-ray Disc (registered trademark), an advanced optical disc (AOD) etc., HD-DCD9 using a red laser, a Blue Laser DVD using a blue-purple laser etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic mail terminal apparatus, comprising:
an address book configured to store mail addresses;
an address registration unit configured to register a first mail address of electronic mail in the address book;
a check code generation unit configured to generate a first check code from the first mail address; and
a check code transmission unit configured to transmit a mail reception permission notification including the first check code generated from the first mail address to a registration unit when the address registration unit registers the first mail address in the address book, and
wherein the mail reception permission notification is a notification that permits receipt of electronic mail transmitted from the first mail address corresponding to the first check code, and
the registration unit compares the first check code with a second check code generated from a second mail address of a source of received mail and transmits the received mail to the electronic mail terminal apparatus when the first and second check codes match each other.

2. The apparatus according to claim 1, wherein
the apparatus is a mobile telephone.

3. The apparatus according to claim 2, wherein
the check code transmission unit transmits the first check code by a social networking service.

4. The apparatus according to claim 1, wherein
the check code transmission unit transmits a telephone number of the apparatus together with the first check code.

5. The apparatus according to claim 1, wherein
the check code generation unit first converts characters configuring the first mail address into codes, and then adds up the codes to generate the first check code.

6. The apparatus according to claim 1, wherein
when the address registration unit receives a notification of completion of registration of the first check code from the registration unit, a registration completion identification is set in a corresponding mail address in the address book.

7. A mail server, comprising:
a check code storage unit configured to store a first check code associated with an electronic mail terminal apparatus that has transmitted the first check code;

a check code registration unit configured to register in the check code storage unit the first check code included in a mail reception permission notification transmitted from the electronic mail terminal apparatus when the electronic mail terminal apparatus registers a first mail address corresponding to the first check code in an address book of the electronic mail terminal apparatus, the mail reception permission notification permitting to receive electronic mail transmitted from the first mail address;

a check code generation unit configured to generate a second check code from a second mail address of a source of received mail;

a check code comparison unit configured to compare the second check code generated by the check code generation unit with the first check code corresponding to the electronic mail terminal apparatus as a destination of the received mail; and a mail transmission unit configured to transmit the received mail to the electronic mail terminal apparatus when the first and second check codes match each other as a result of comparison by the check code comparison unit.

8. The mail server according to claim 7, wherein
the electronic mail terminal apparatus is a mobile telephone and the check code storage unit stores a telephone number of the mobile telephone associated with the first check code.

9. The mail server according to claim 7, wherein
the check code generation unit generates the second check code in the same method as a method of generating the first check code in the electronic mail terminal apparatus.

10. The mail server according to claim 7, further comprising
a received mail storage unit configured to store the received mail, wherein:
the electronic mail terminal apparatus is a mobile telephone; and
when the first and second check codes match each other as the result of comparison by the check code comparison unit, the mail transmission unit stores the received mail in the received mail storage unit, transmits a notification of the received mail to the electronic mail terminal apparatus, and transmits the received mail in the received mail storage unit to the electronic mail terminal apparatus when a reply is transmitted from the electronic mail terminal apparatus.

11. A check code registering method, comprising:
registering a first mail address of electronic mail in an address book to store mail addresses;
generating a first check code from the first mail address; and
transmitting a mail reception permission notification including the first check code generated from the first mail address from an electronic mail terminal apparatus to a registration unit when the first mail address is registered in the address book, and
wherein the mail reception permission notification is a notification that permits receipt of electronic mail transmitted from the first mail address corresponding to the first check code, and
the registration unit compares the first check code with a second check code generated from a second mail address of a source of received mail and transmits the received mail to the electronic mail terminal apparatus when the first and second check codes match each other.

12. A mail reception permitting method, comprising:
registering a first check code included in a mail reception permission notification transmitted from an electronic mail terminal apparatus with the first check code associated with the electronic mail terminal apparatus when the electronic mail terminal apparatus registers a first mail address corresponding to the first check code in an address book of the electronic mail terminal apparatus, the mail reception permission notification permitting to receive electronic mail transmitted from the first mail address;
generating a second check code from a second mail address of a source of received mail;
comparing the second check code generated by the check code generation unit with the first check code associated with the electronic mail terminal apparatus as a destination of the received mail; and
transmitting the received mail to the electronic mail terminal apparatus when the first and second check codes match each other as a result of comparison.

13. A non-transitory computer-readable storage medium storing a program executed by a terminal device and used to direct the terminal device to perform:
registering a first mail address of electronic mail in an address book to store mail addresses;
generating a first check code from the first mail address; and
transmitting a mail reception permission notification including the first check code generated from the first mail address to a registration unit when the first mail address is registered in the address book, and
wherein the mail reception permission notification is a notification that permits to receipt of electronic mail transmitted from the first mail address corresponding to the first check code, and
the registration unit compares the first check code with a second check code generated from a second mail address of a source of received mail and transmits the received mail to the terminal device when the first and second check codes match each other.

14. A non-transitory computer-readable storage medium storing a program executed by an information processing device and used to direct the information processing device to perform:
registering a first check code included in a mail reception permission notification transmitted from an electronic mail terminal apparatus with the first check code associated with the electronic mail terminal apparatus when the electronic mail terminal apparatus registers a first mail address corresponding to the first check code in an address book of the electronic mail terminal apparatus, the mail reception permission notification permitting to receive electronic mail transmitted from the first mail address;
generating a second check code from a second mail address of a source of received mail;
comparing the second check code generated by the check code generation unit with the first check code associated with the electronic mail terminal apparatus as a destination of the received mail; and
transmitting the received mail to the electronic mail terminal apparatus when the first and second check codes match each other as a result of comparison.

* * * * *